United States Patent Office 2,781,363
Patented Feb. 12, 1957

2,781,363

PURIFICATION OF VITAMIN K₁

Ralph F. Hirschmann, Westfield, Norman L. Wendler, Summit, and Richard Miller, New Brunswick, N. J., assignors to Merck & Co., Inc., Rahway, N. J., a corporation of New Jersey No Drawing. Application June 4, 1954,
Serial No. 434,678

3 Claims. (Cl. 260—396)

This invention relates to vitamin $K_1$. More particularly, this invention is concerned with a novel method of effecting the purification of vitamin $K_1$.

Vitamin $K_1$, or 2-methyl-3-phytyl-1,4-naphthoquinone, has important uses in medicinal chemistry. It is produced commercially by several methods from either natural products or by synthesis from simpler chemical compounds. According to most of these methods of production, the vitamin $K_1$ obtained directly is of reasonable good quality but nevertheless lacking the high degree of purity required for medicinal applications. This lack of purity is evidenced by the vitamin having a dark color, such as a deep amber to orange color as compared to the light buff or straw color possessed by pure vitamin $K_1$. This undesirable dark color is probably due to the presence of apparently innocuous impurities of unknown composition. The removal of these substances is important not only to raise the ultimate purity of the product, but also to provide a product having a more satisfactory and elegant color since pharmaceutical products possessed of dark colors are not readily received in the trade. Various methods of increasing the purity of vitamin $K_1$ and removing the undesirable color have been proposed and have been used to some extent. None of these, however, have been found entirely suitable to achieve the desired result.

An object of this invention, therefore, is to provide a process of increasing the purity of vitamin $K_1$. An additional object is to provide a method by which vitamin $K_1$ of a satisfactory light buff color may be produced from darker colored, impure vitamin $K_1$. Additional objects will appear from the following description of the invention.

It has been discovered according to the present invention that by contacting impure vitamin $K_1$ with a suitable magnesia-silica gel type adsorbent the undesirable contaminants may be removed and vitamin $K_1$ produced of markedly increased purity having the highly desirable light color, i. e., light buff.

The discovery that vitamin $K_1$ may be purified by the use of a magnesia-silica gel type adsorbent was surprising because other adsorbents such as charcoal and alumina were found incapable of effecting a similar purification. Although any suitable adsorbent of the magnesia-silica gel type may be used in this invention, it is preferred to employ adsorbents of this type such as one sold by the Floridin Co. under the name Florisil, a method for the preparation of which is believed disclosed in U. S. Patent No. 2,393,625.

Impure vitamin $K_1$ may be treated according to this invention to increase its purity and improve its color regardless of the method by which the vitamin was originally produced or isolated. This invention, however, is particularly useful for effecting the final purification of vitamin $K_1$ that is of reasonably high purity to begin with such as partially refined vitamin $K_1$ and concentrates containing over 70% vitamin $K_1$.

The purification of vitamin $K_1$ is achieved according to this invention when contacted with a magnesia-silica gel type adsorbent through adsorbtion of the impurities present in the vitamin solution. Various procedures of a closely related nature may be conveniently employed to effect contact between the adsorbent and impure vitamin of which two may be particularly described. In one method, a suitable solvent solution of the impure vitamin $K_1$ may be prepared and added to a column of the adsorbent whereby the impurities and vitamin $K_1$ are both adsorbed and then the vitamin selectively eluted from the column without desorbing the impurities. However, the use of a column is not essential and in one variation of this method the use of a column may be avoided by combining the impure vitamin $K_1$ solution and adsorbent in a batch-wise manner and, after a suitable period of mixing to enhance adsorbtion, the mixture may be filtered and the pure vitamin $K_1$ recovered by selective elution.

Suitable solutions for contacting with a magnesia-silica gel type adsorbent to effect adsorbtion of the vitamin and impurities may be conveniently prepared by dissolving impure vitamin $K_1$ in a highly non-polar organic solvent or mixture of such solvents. Particular classes of such solvents which may be used are the saturated hydrocarbons including straight and branched chain and cyclic compounds which are solvents for vitamin $K_1$ and preferably having from 5 to 10 carbons such as petroleum ether, cyclopentane, hexane and heptane.

After the vitamin has been adsorbed it may be conveniently eluted by continued washing with the solvent or mixture of solvents used in effecting the initial adsorbtion. This method of elution however requires excessive time and volumes of solvents. A more efficient and preferable method is to effect elution with a saturated hydrocarbon of the desired type mixed with up to 15% by volume of an aromatic hydrocarbon preferably of 6 to 10 carbons such as benzene, toluene, and xylene. Other solvents and mixtures of solvents which are more polar than hexane may also be used for the elution.

In one particular embodiment of this method a petroleum ether solution of impure vitamin $K_1$ is contacted with a magnesia-silica gel type adsorbent which is then washed with a 5% benzene-petroleum ether mixture to elute the purified vitamin. After the elution has been effected the vitamin containing eluate may be evaporated under reduced pressure to remove the solvent and thereby isolate the purified vitamin $K_1$. The resulting product has a clear light-buff color.

In a second and alternative method, a suitable solution of impure vitamin $K_1$ may be prepared which, when contacted with a magnesia-silica gel type adsorbent results in preferential adsorbtion of the impurities with much less adsorbtion of the vitamin. Such a preferential adsorbtion may be conveniently achieved by bringing in contact with the adsorbent solutions comprising impure vitamin $K_1$ dissolved in a saturated straight or branched chain or cyclic hydrocarbon, preferably of 5–10 carbons, such as petroleum ether, hexane and cyclohexane, mixed with up to 15% by volume of an aromatic hydrocarbon such as benzene and toluene. This preferential adsorption may be conveniently effected by the use of either a column-wise or batch-wise process. Following adsorption of the impurities and elution of the vitamin, the adsorbent may be washed with a similar solvent mixture and the wash combined with the purified vitamin solution. By evaporating the solvents the vitamin is obtained in a pure form. This method may be specifically illustrated by dissolving vitamin $K_1$ in a 5% benzene-petroleum ether mixture, contacting the solution with a column of a magnesia-silica gel type adsorbent, collecting the eluate, washing with 5% benzene-petroleum ether, combining the eluates and evaporating the solvents to isolate the pure vitamin.

The purification of vitamin $K_1$ attained by this invention is conveniently illustrated in terms of two generally accepted criteria of purification. These criteria are the Gardner color number and the ultraviolet extinction coefficients at specified wave lengths from which purity of the vitamin may be calculated. The Gardner color number of vitamin $K_1$ samples is conveniently determined by comparing the color of the vitamin with ferric chloride-cobalt chloride color standards as described in Colorimetric Methods of Analysis by Snell and Snell, 1937, pages 676 and 677. In terms of Gardner Color Standards the color of vitamin $K_1$ considered of unsatisfactory purity has a number of about 13 to 15 or above and is deep buff or orange. Vitamin $K_1$ purified according to this invention however has a Gardner number of about 10 or below and is an elegant straw color. Such purified vitamin $K_1$ is highly suitable for pharmaceutical uses.

In addition to enhancing the purity of the vitamin in respect to color the ultraviolet extinction coefficients (E%) at characteristic wave lengths are increased significantly, thereby demonstrating further that this invention provides a suitable method of providing highly pure vitamin $K_1$.

The following examples are added to illustrate but not to limit the invention.

*Example 1*

A solution of 1 g. of impure vitamin $K_1$ having a Gardner color standard of about 14 in 300 ml. of petroleum ether was added to a column containing about 10 g. of Florisil, a magnesia-silica gel type adsorbent. The column was washed with a 5% benzene-petroleum ether mixture to elute the vitamin $K_1$. The solvent was evaporated to isolate the purified vitamin which had a Gardner color standard of 11.

The use of alumina in place of Florisil did not improve the color of vitamin $K_1$ when a similar experiment was performed.

*Example 2*

A 10 g. sample of impure vitamin $K_1$ having a Gardner color of 15 was dissolved in 15 ml. of a 5% benzene-petroleum ether mixture. The vitamin $K_1$ solution was passed through a 50 g. column of Florisil prepared in a 5% benzene-petroleum ether mixture and covered with a thin layer of sea sand. Elution of the vitamin was completed with 5% benzene-petroleum ether. The combined eluates were concentrated and the purified vitamin recovered. It had a Gardner color of 10.5.

*Example 3*

A 1.01 g. sample of vitamin $K_1$ of 96.3% purity was dissolved in 5 ml. of a 5% benzene-petroleum ether mixture. The vitamin solution was added to a 5.05 g. column of a magnesia-silica gel type adsorbent in the same solvent system. The initial eluate was collected and the column was eluated further with 99 ml. of the 5% benzene-petroleum ether mixture. The combined eluates were concentrated to recover the vitamin $K_1$ essentially 100% pure.

The Gardner color standard of the final product was 11 whereas the starting material was 13–14.

Various changes and modifications of the invention can be made and, to the extent that such variations incorporate the spirit of this invention, they are intended to be included within the scope of the appended claims.

What is claimed is:

1. The process which comprises contacting a solution of impure vitamin $K_1$ that is at least 70% pure and has a Gardner color standard of around 13–15 in an organic solvent of the group consisting of saturated straight and branched chain and cyclic hydrocarbons, with a magnesia-silica gel type adsorbent to adsorb the vitamin and impurities on the adsorbent, eluting the vitamin from the adsorbent without substantial desorbtion of the impurities with a solvent mixture comprising a solvent of the group consisting of saturated straight and branched chain and cyclic hydrocarbons mixed with up to 15% by volume of a solvent of the group consisting of aromatic hydrocarbons, and evaporating the eluate to recover essentially pure vitamin $K_1$ having a Gardner color standard not greater than 11.

2. The process which comprises contacting a petroleum ether solution of impure vitamin $K_1$ that is at least 70% pure and has a Gardner color standard of around 13–15 with a magnesia-silica gel type adsorbent to adsorb the vitamin and impurities on the adsorbent, eluting the vitamin from the adsorbent without substantial desorbtion of the impurities with a mixture of petroleum ether containing up to 10% by volume of benzene, and evaporating the eluate to recover essentially pure vitamin $K_1$ having a Gardner color standard not greater than 11.

3. The process which comprises contacting a solution of impure vitamin $K_1$ that is at least 70% pure and has a Gardner color standard of around 13–15 in a mixture of petroleum ether containing up to 10% by volume of benzene, with a magnesia-silica gel type adsorbent to adsorb the impurities without essential adsorbtion of the vitamin, separating the adsorbent and evaporating the vitamin solution to recover an essentially pure vitamin $K_1$ having a Gardner color standard not greater than 11.

References Cited in the file of this patent

UNITED STATES PATENTS

| | | |
|---|---|---|
| 2,295,129 | Riegel | Sept. 8, 1942 |
| 2,348,037 | Thayer | May 2, 1944 |
| 2,393,625 | Simons | Jan. 29, 1946 |

OTHER REFERENCES

Doisy: Chem. Rev. 28, 486–87 (1941).